US006622259B1

(12) United States Patent
Schmuck (10) Patent No.: US 6,622,259 B1
(45) Date of Patent: Sep. 16, 2003

(54) NON-DISRUPTIVE MIGRATION OF COORDINATOR SERVICES IN A DISTRIBUTED COMPUTER SYSTEM

(75) Inventor: Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 09/616,844

(22) Filed: Jul. 14, 2000

(51) Int. Cl.$^7$ ................................................. G06F 11/00
(52) U.S. Cl. ............................. 714/4; 712/216; 709/102
(58) Field of Search ................................. 709/106, 105, 709/102, 103; 712/216, 217; 714/4, 15

(56) References Cited

U.S. PATENT DOCUMENTS

| | | | |
|---|---|---|---|
| 5,130,992 A | | 7/1992 | Frey, Jr. et al. |
| 5,230,047 A | | 7/1993 | Frey, Jr. et al. |
| 5,566,297 A | | 10/1996 | Devarakonda et al. |
| 5,659,682 A | | 8/1997 | Devarakonda et al. |
| 5,748,934 A | * | 5/1998 | Lesartre et al. ............. 712/216 |
| 5,768,556 A | * | 6/1998 | Canada et al. .............. 712/216 |
| 5,805,785 A | | 9/1998 | Dias et al. |
| 5,805,786 A | | 9/1998 | Badovinatz et al. |
| 5,875,290 A | | 2/1999 | Bartfai et al. |
| 5,898,853 A | * | 4/1999 | Panwar et al. ............. 712/216 |
| 5,907,701 A | * | 5/1999 | Hanson ...................... 709/101 |
| 5,926,619 A | | 7/1999 | Badovinatz et al. |
| 6,014,669 A | | 1/2000 | Slaughter et al. |
| 6,021,508 A | | 2/2000 | Schmuck et al. |
| 6,148,322 A | * | 11/2000 | Sand et al. .................. 709/103 |
| 6,154,849 A | * | 11/2000 | Xia ............................... 714/4 |
| 6,457,008 B1 | * | 9/2002 | Rhee et al. ................... 707/10 |
| 6,542,986 B1 | * | 4/2003 | White ......................... 712/217 |

OTHER PUBLICATIONS

IBM Technical Disclosure Bulletin vol. 26 No. Jan. 8, 1984 pp. 4250–4251 Distributed Transaction Commit Protocols for Highly Available Systems.

IBM Technical Disclosure Bulletin: vol. 37 No. 02B Feb. 1994 pp. 231–234 Providing a Single–Node Image for Connection to a Multisystem Network Node.

* cited by examiner

Primary Examiner—Robert Beausoliel
Assistant Examiner—Christopher McCarthy
(74) Attorney, Agent, or Firm—Lawrence D. Cutter; Jon A. Gibbons; Fleit, Kain, Gibbons, Gutman & Bongini P.L.

(57) ABSTRACT

This invention allows a related set of coordinator services to migrate from one node to another without disrupting applications on any of the nodes in the system. Unlike other methods, this invention allows a set of interdependent services to be brought to "quiescence" and migrated together. Since service operations depend upon the results and/or data of other service operations, any particular operation can only complete properly when those other operations return data necessary for the completion of the dependent operation. Therefore, this invention permits the completion of non-disruptive migration by phasing the "quiescence" of the services. Operations that are most dependent upon other operations are suspended before those other operations; then the process waits for any current operations to complete. Once the first phase of dependent operations have completed, the next phase of dependent operational services are suspended, the process waits for completion of those operations and so on until there are no more phases to the "quiescence" process. Hence, the invention is applicable to more complex distributed applications than previous methods.

19 Claims, 8 Drawing Sheets

FIG. 1

PRIOR ART

| Operation | Dep. Level |
|-----------|------------|
| OP1       | 3          |
| OP2       | 1          |
| OP3       | 2          |
| OP4       | 1          |

NON-DISRUPTIVE MIGRATION OF COORDINATOR SERVICES IN A DISTRIBUTED COMPUTER SYSTEM

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention relates to distributed computer systems and more particularly to an improved system and method for movement of services among nodes.

BACKGROUND OF THE INVENTION

Figure 1:
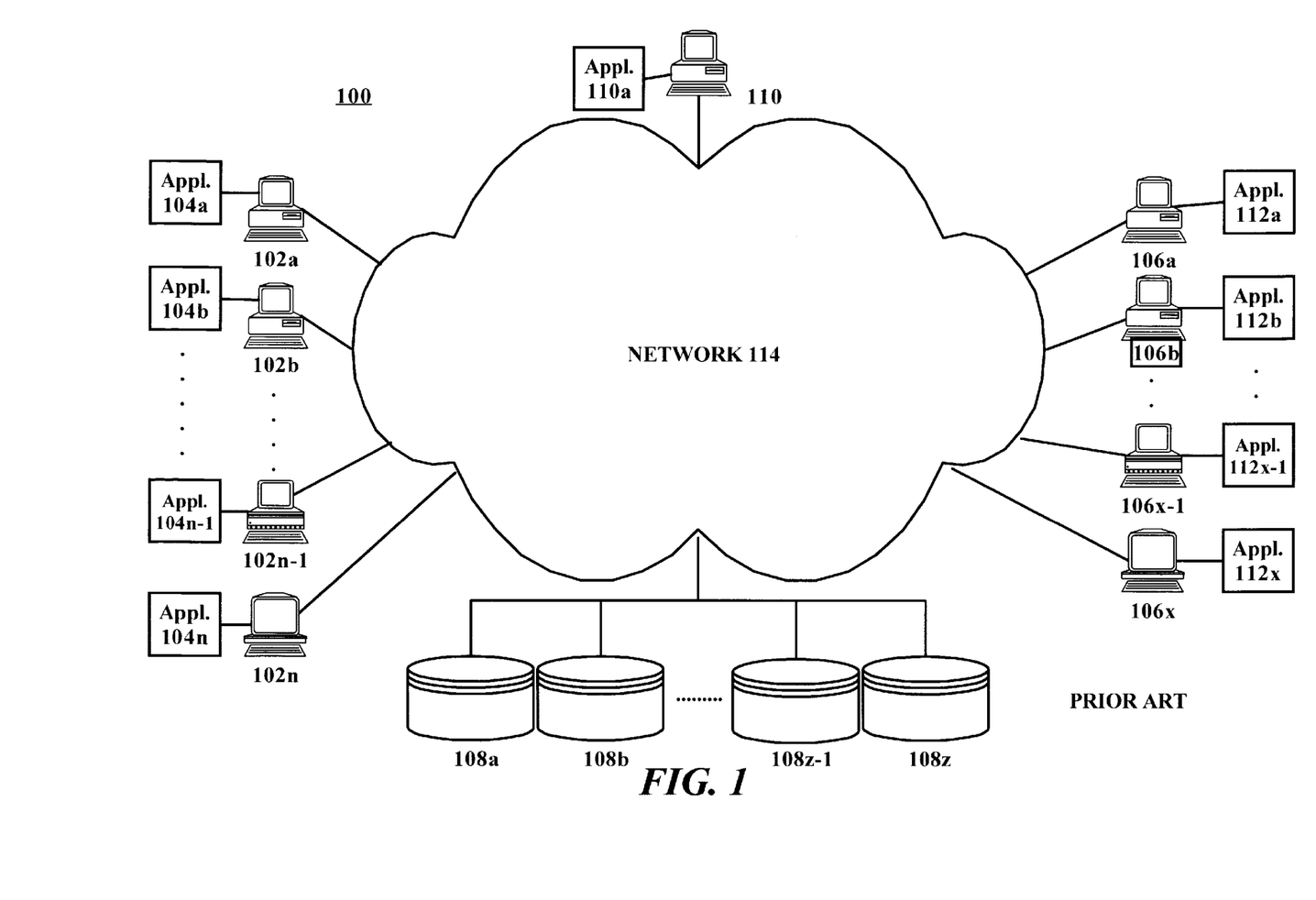
FIG. 1 is a system level overview of a typical prior art distributed information processing network within which the present invention may be practiced.

Distributed computer systems can store enormous amounts of information that can be accessed by users for identification and retrieval of valuable documents that contain data, text, audio and video information. A typical example of a distributed system (100) is shown in FIG. 1. This invention applies to distributed applications (104a to 104n and 112a to 112x) running on a distributed computer system. A distributed computer system consists of computer nodes (102a to 102n and 106a to 106x) and a communication network (114) that allows the exchange of messages between computer nodes. A distributed application (104a to 104n and 112a to 112x) is a program running on multiple nodes in the distributed system, which work together to achieve a common goal (e.g., a parallel scientific computation, a distributed database, or a parallel file system). In addition, shared disk storage (108a to 108z) may be available for the storage of data by the computer nodes.

Certain operations of a distributed application may require coordination between all of the participating nodes. A common technique for implementing such operations is to appoint a single "coordinator" node (110) that performs all operations that require such coordination. If another node needs to execute one of these operations, it does so by sending a message to the coordinator node, which will perform the operation on behalf of the other node and then send a reply with the result of the operation to the requesting node.

In order to make a distributed application fault tolerant, another node must be able to take over the service provided by the coordinator node in case the coordinator fails. In order to take over the service, the new coordinator node may need to rebuild state that was maintained by the old coordinator. Well-known techniques for rebuilding the necessary state include the use of stable storage (e.g., dual-ported disks or network attached, shared disks), and the collection of information from the other nodes in the system as well as disk striping of rebuild information, RAID arrays or the equivalent.

Figure 3:
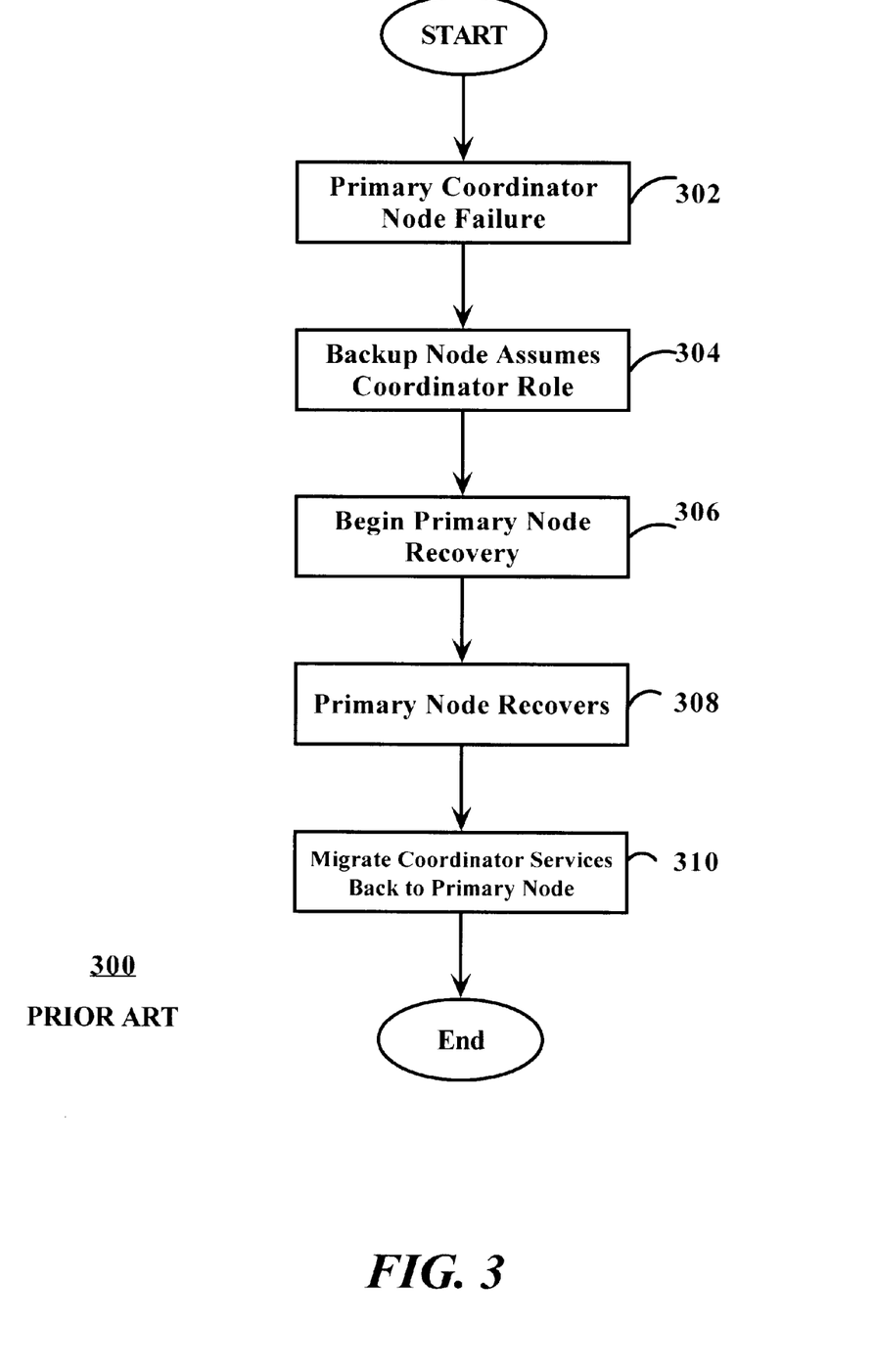
FIG. 3 is a flow diagram that illustrates a primary node failure and recovery process in the Prior Art.

Often it is desirable to move coordinator services even when there are no failures. For example, when using a primary/backup scheme for fault tolerance (see FIG. 3), if the primary had failed (302) and the backup node is acting as coordinator (304), then when the primary begins to recover (306) and then becomes available again (308), it is desirable to move coordinator services from the backup node back to the primary node (310). Another example is the migration of coordinator services between nodes in order to balance the CPU load or other resource usage among the available nodes. Although it would be possible to use fail-over code to force a coordinator function to move from a node N1 to a node N2, this may be disruptive to the distributed application for a variety of reasons; the application may even be forced to shut down and restart on N1 and/or on other nodes.

Previously known methods for migrating coordinator services only work under certain restrictive assumptions about the distributed application and/or the coordinator services it uses namely:

1. If it is possible to interrupt and "cleanly" abort pending coordinator operations without disrupting other parts of the distributed application on the same node, then it is possible to migrate services from one node to another in very much the same way as in case of a node failure. However, this assumes that coordinator operations do not share any data structures with other parts of the distributed application, or at least that it is possible to undo the effect of a partially completed operation so that the shared data structures can be restored to a consistent state. Furthermore, this approach only works if such undo actions do not require invoking additional coordinator operations.

2. If there are no dependencies between coordinator operations, then it is possible to suspend all new operations, wait for all pending operations to complete, and then migrate coordinator services to another node without disruption. For example, the IBM® Recoverable Virtual Shared Disk (RVSD) product for the RS/6000® SP allows migrating a virtual disk server from a primary server node to a backup server node and back. It does so by suspending all VSD requests (requests to read and write a disk block) prior to migrating a VSD server to the other node. This approach works because each disk I/O request is independent (completing one disk I/O request does not require the VSD server to issue additional I/O request or any other requests to other services). If operations are not independent, this approach can deadlock.

3. If there are dependencies between coordinator operations, it may be possible to group these operations into a set of distinct services such that operations belonging to the same service are independent of each other. In this case it may be possible to use traditional methods to migrate each of these services independently, one at a time.

Although these prior art migration services are useful, all of the above methods have their shortcomings. A shortcoming of method two described above is that it cannot operate for services that are interdependent. Method one cannot be applied when the application does not allow pending operations to simply be aborted. Method three cannot be used when these services cannot be migrated one at a time, for example, because all of the services depend on some common infrastructure that cannot easily be split along service boundaries. Accordingly, a need exists for migration services that can operate when the services are interdependent.

Another shortcoming with known methods for migrating services is the inability not only to handle services that are directly interdependent but indirectly interdependent as well. For example in order to process an operation OP1, a service may need to invoke another service operation OP2; hence OP1 directly depends on OP2. And an example of an indirect dependency would be if operation OP1 required a shared resource, e.g., a lock, that might be held by an unrelated operation OP3 on the same or another node; OP3 might need to invoke a service operation OP4 before it can release the resource it is holding. In this example, OP1 would indirectly depend on OP4. The prior art method of simply suspending all new operations would lead to deadlock since OP1 cannot compete until OP4 completes. Accordingly, a need exists for migration services that can operate when the services are not only directly interdependent but indirectly interdependent as well.

SUMMARY OF THE INVENTION

This invention allows a related set of coordinator services to migrate from one node to another without disrupting applications on any of the nodes in the system. Unlike other methods, this invention allows a set of interdependent services to be quiesced and migrated together. Since service operations depend upon the results and/or data of other service operations, any particular operation can only complete properly when those other operations return data necessary for the completion of the dependent operation. Therefore, this invention permits the non-disruptive migration by phasing the "quiescence" of the services. Operations that are most dependent upon other operations are suspended before those other operations; then the process waits for any current operations to complete. Once the first phase of dependent operations have completed, the next phase of dependent operational services are suspended, the process waits for completion of those operations and so on until there are no more phases to the "quiescence" process. Hence the invention is applicable to more complex distributed applications than previous methods.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Parallel Distributed Computing Environment

Figure 2:
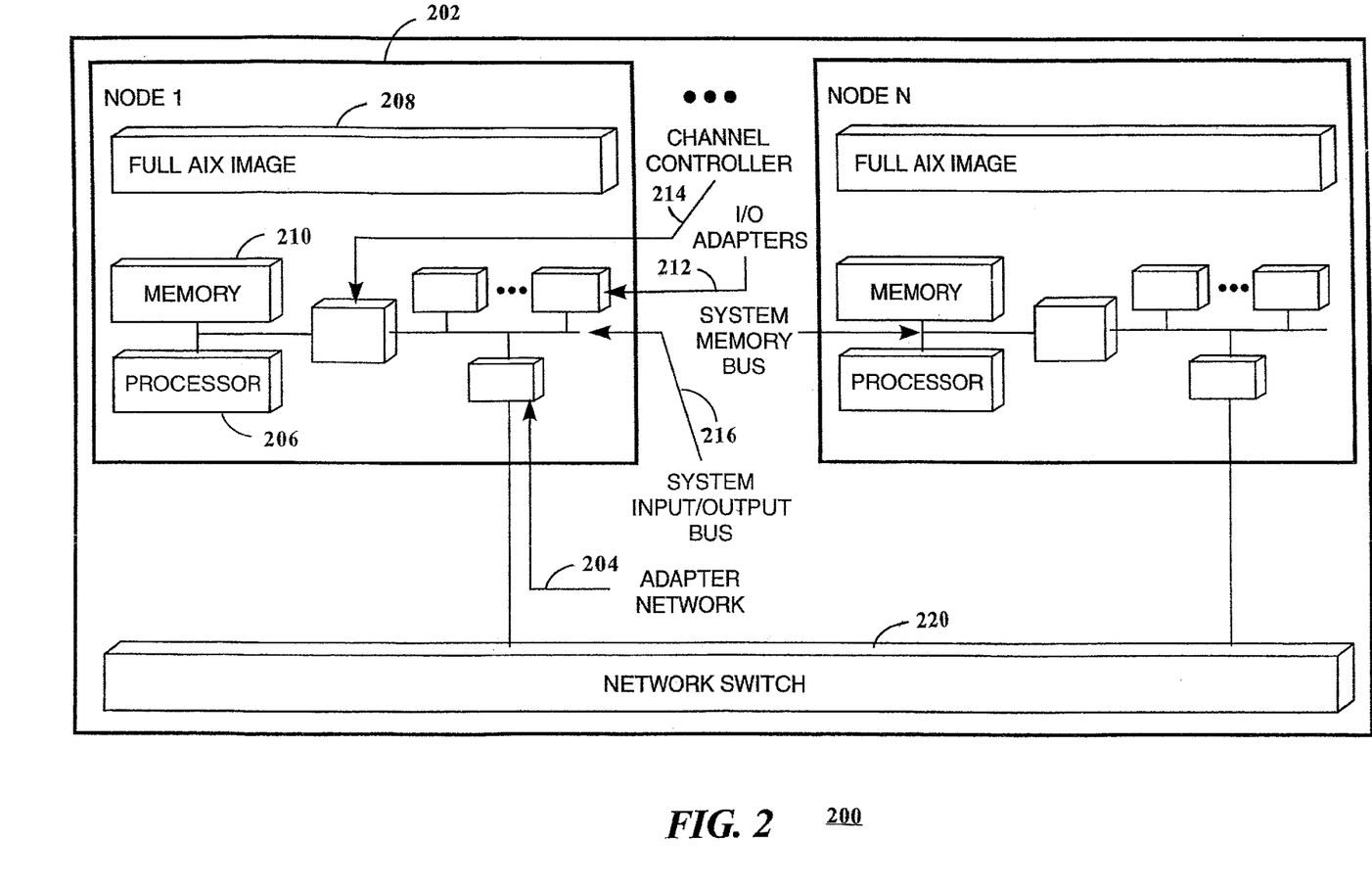
FIG. 2 depicts one example of a highly parallel distributed multiprocessor systems computing environment incorporating the principles of the present invention.

Referring now in more detail to the drawings in which like numerals refer to like parts throughout several views, FIG. 2 is a block diagram of a distributed computing environment 200 that includes a plurality of nodes 202 coupled to one another via a plurality of network adapters 204. Each node 202 is an independent computer with their own operating system image 208, memory 210 and processor(s) 206 on a system memory bus 218, a system input/output bus 216 couples I/O adapters 212 and network adapter 204. Each network adapter is linked together via a network switch 220.

In one example, distributed computing environment 200 includes N nodes 202 with one or more processors 206. In one instance, each processing node is, a RISC/6000 computer running AIX, the IBM version of the UNIX operating system. The processing nodes do not have to be RISC/6000 computers running the AIX operating system. Some or all of the processing nodes 202 can include different types of computers and/or different operating systems 208. All of these variations are considered a part of the claimed invention.

Exemplary Embodiment of Non-disruptive Migration of Coordinator Services

A service or collection of services that might need to migrate from one node to another is defined in terms of a set of operations that can be invoked locally on the node on which the service is running or remotely, from another node, through a request/reply message pair (also called remote procedure call or RPC).

Figure 4:
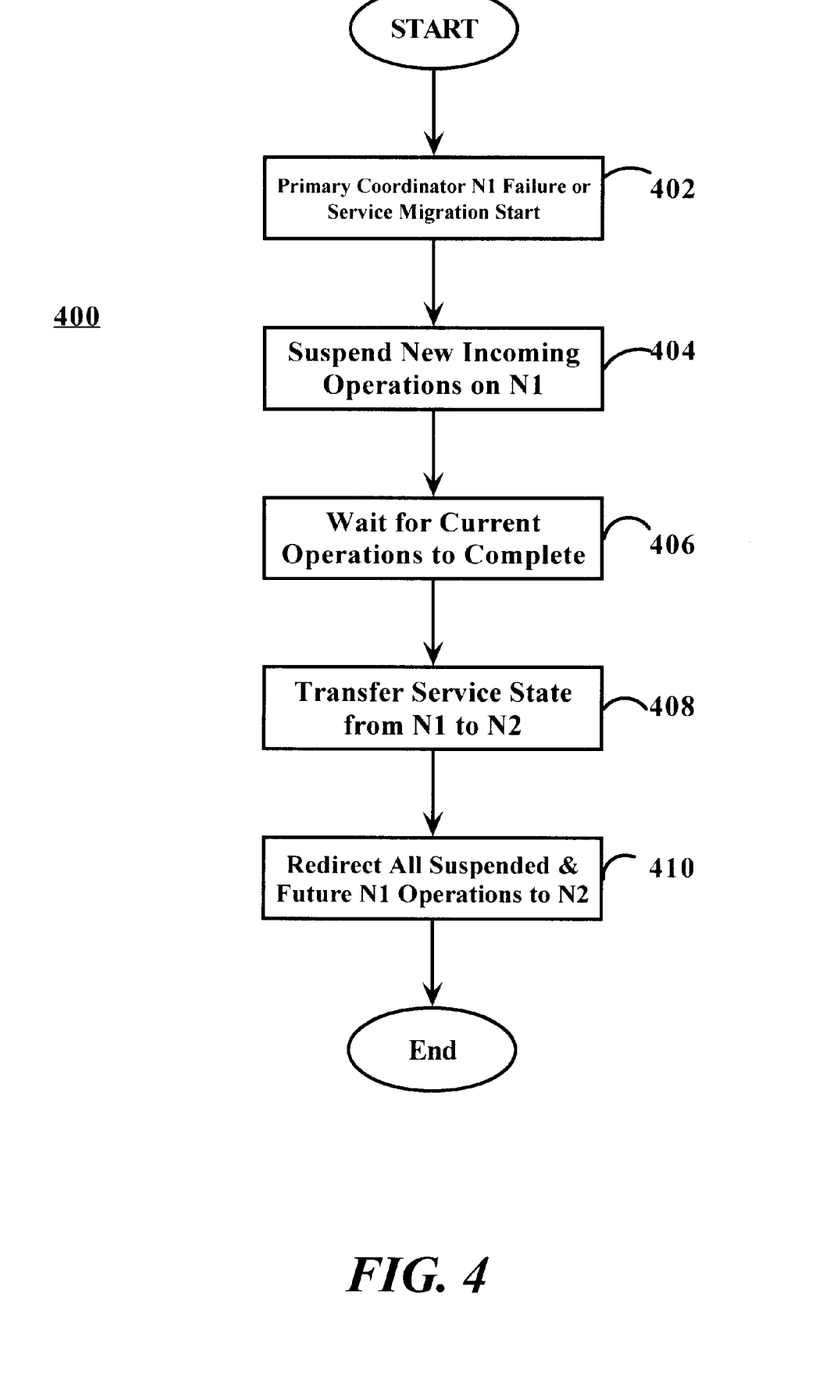
FIG. 4 is a flow diagram that illustrates a functional overview for failure recovery and service migration as practiced in this invention.

Referring to FIG. 4, is a flow diagram 400 illustrating a functional overview for service migration of a collection of services from a node N1 to a node N2. The migration broadly consists of the following steps:

(402) Service Migration Start;
  (404) Suspending new incoming operations;
  (406) Waiting for all operations that are currently being processed to complete;
  (408) Transferring the service state from node N1 to node N2;
  (410) Redirecting all suspended and future operations from N1 to N2.

Figure 5:
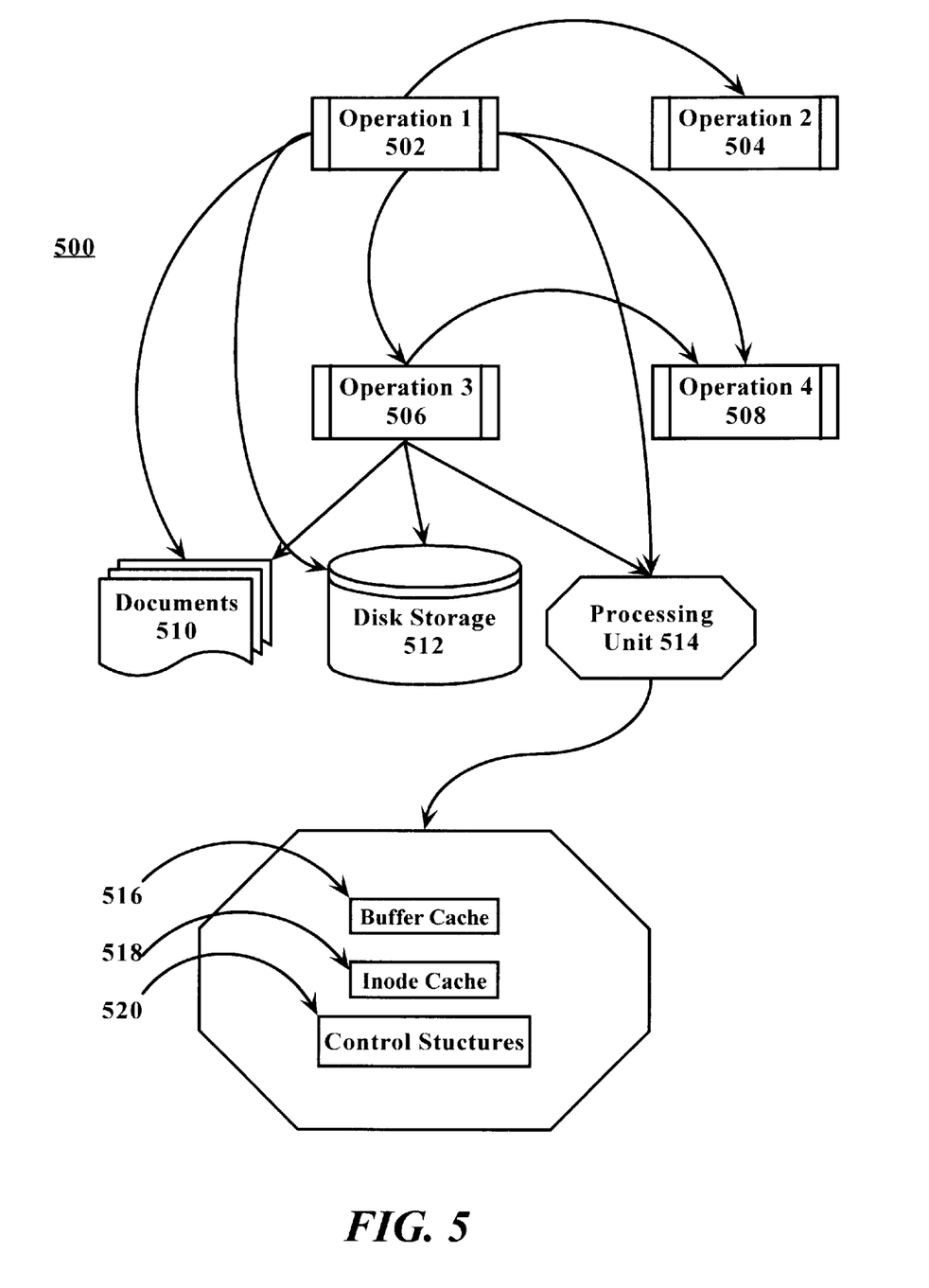
FIG. 5 is a block diagram that illustrates a dependency tree for various operations.

However, there is a unique challenge in making this work in that the various operations being migrated may directly or indirectly depend upon each other; in other words, they are interdependent. Turning to FIG. 5, a block diagram 500 illustrates a dependency tree for various operations. In order to process an operation OP1 (502), the service may need to invoke another service operation OP2 (504); hence OP1 directly depends on OP2. An example of an indirect dependency would be if operation OP1 required a shared resource, e.g., a lock, that might be held by an unrelated operation OP3 (506) on the same or another node (510, 512, 514); OP3 might need to invoke a service operation OP4 (508) before it can release the resource it is holding. In this example, OP1 would indirectly depend on OP4.

Simply suspending all new operations at once in Step (404) could quickly lead to deadlock in Step (406). This because a currently running operation OP1 may still need to invoke an operation OP2, but since all operations are suspended, OP1 cannot complete until suspended operations are resumed in Step (410). The process, however, would never get to Step (410) because Step (406) will not complete until OP1 has completed. In other words, the operations are interdependent and this operational interdependency prevents the completion of nodal recovery or the migration of system services.

This problem is solved by suspending operations in multiple "phases" based on a numerical "dependency level" assigned to each operation. The dependency levels must be chosen to satisfy the following condition:

IF an Operation OPX directly or indirectly depends on an Operation OPY, THEN
the dependency level of OPX must be higher (larger previously assigned numerical value) than the dependency level of OPY.

Figure 6:
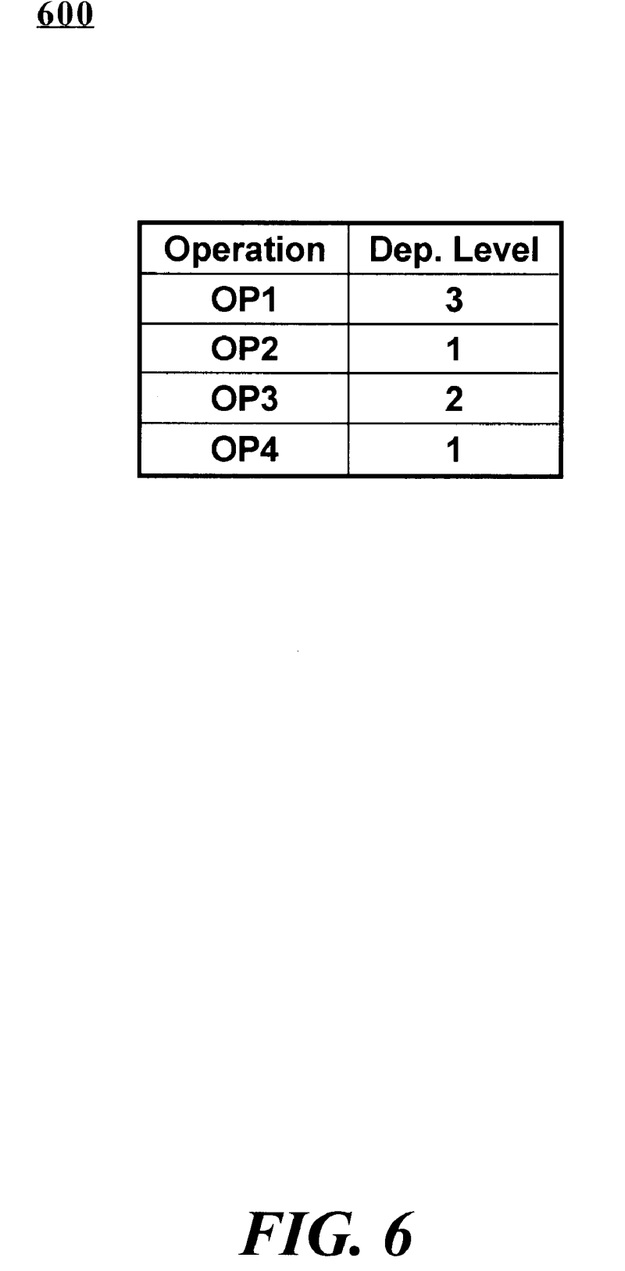
FIG. 6 is a block diagram that illustrates the operational and dependency level for various operations.

Such an assignment can always be found as long as the dependency relation is a-cyclic; this is a reasonable assumption, because otherwise, operations could deadlock even in the absence of any failures or migration attempts. Different operations may have the same dependency level if they do not depend upon each other. Given the dependency level assignments, service operations are suspended in multiple phases, one phase for each distinct dependency level. FIG. 6 shows an operational and dependency level chart for operations OP1 to OP4 shown in FIG. 4. Since OP2 and OP4 do not depend upon any other operation they are at dependency level 1. OP3 is at dependency level 2 since it depends only upon OP4 and OP1 is at dependency level 3 since it depends upon OP2, OP3 and OP4.

Figure 7:
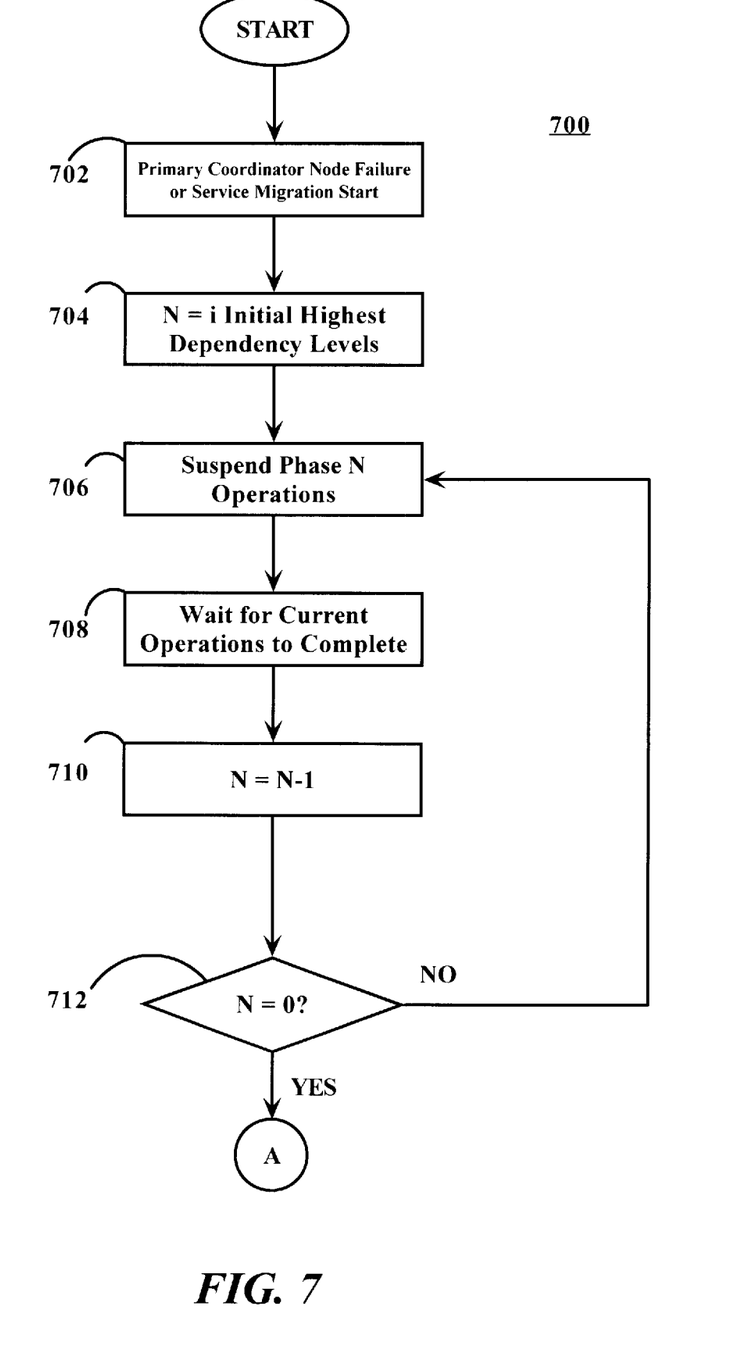
FIG. 7 is a flow diagram that illustrates a functional overview of non-disruptive migration of services.

FIG. 7 is a flow diagram 700 that illustrates the steps involved in a Non-Disruptive Migration of Coordinator Services in a Distributed Computer System. First the Service Migration starts (702). N is determined to be the highest dependency level that was assigned (704). In the first phase, all new operations with dependency level N are suspended (706). Then the process waits for operations with dependency level N that are already being processed to complete (708) before proceeding to the next phase. The value of N is reduced by one to indicate that the Nth quiescent phase has completed (710). A determination of whether all phases have completed (N=0) is then made (712). If the suspension of all phases has not yet occurred, then the process returns to the next phase, where all operations with the next highest dependency (N−1) level are quiesced, and so on, until all operations have been suspended and all pending operations have completed. This phased approach will not deadlock because in any given phase N the process only waits for operations with the dependency level N to complete. All operations that these may depend on have a lower dependency level and will not be suspended until a later phase.

Once all operations are suspended and no more operations are being processed, any state maintained by a node N1 that is required to provide the service(s) being migrated is transferred to a node N2 (714). This can be done by sending explicit messages containing state information sent from N1 to N2 (716). Alternatively, N1 may simply discard its state (722), whereupon N2 will recover the state by invoking methods that are also used to handle the failure case (724) e.g., N2 taking over services due to a failure of N1. The former approach of the explicit state transfer allows for a faster migration, whereas the latter approach of state recovery requires less code to be implemented assuming that failure recovery methods are available.

When N2 is ready to handle service requests, all nodes on which the distributed application is running are informed of the new location of the service(s) (718). All future requests will then be sent to N2 instead of N1. Operations that were suspended are completed with a special error code (720) indicating that the operation was not processed because the service has migrated. Upon receiving such a reply the node that issued the request re-sends the request to N2, where it will then be processed normally.

This migration method is implemented in the IBM General Parallel File System for AIX, Version 1, Release 3 (GPFS). The GPFS allows migration of a file system manager from one node to another. In GPFS, the file system manager provides a number of services:

Management of disk failures;
Coordination of distributed locking;
Creation and assignment of log files;
Coordination of disk space allocation;
Management of quotas;
Performance of file system configuration changes.

There are several dependencies between operations provided by these services. For example, creating a log file requires locking allocation maps and may require handling a disk failure in order to complete the creation of a log file. Many of these operations access data structures that are also used by normal file system operations on the same node, for example the (see FIG. 5) buffer cache (516), inode cache (518), and related control structures (520). These operations can therefore not be aborted without aborting all normal file system operations as well. Hence, doing so will disrupt all local application programs that are accessing the file system. Finally, the implementation of these services, as well as the infrastructure for invoking these, require all of theses service to be running on the same node, i.e., these services cannot be migrated one at a time. None of the traditional migration methods can be used in GPFS without disrupting applications using the file system. Therefore, the novel teachings found herein would be necessary for the stall free migration of operational services. This invention allows migrating such a set of services together in a single step. For this reason this invention enables non-disruptive migration of coordinator services in distributed applications for which the traditional methods will fail. For example, see the GPFS parallel file system, as described above.

In this manner, an improved system and method for non-disruptive migration of coordinator services in a distributed computer system has been described that overcomes the imperfections of the prior art. Now, the interdependence of operational services does not cause disruption of an application nor does migration of service deadlock while waiting for a set of interdependent operations to complete. Rather, the use of the teachings found herein on non-disruptive migration of coordinator services in a distributed computer system allows for the efficacious recovery from a nodal failure and the appropriate migration of services from one node to another.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method for nodal migration of services associated with a network having a plurality of nodes connected thereto, the method on a first node comprising the steps of:
   assigning a dependency level to each service of a set of nodal services; and
   determining a highest number of dependency levels present in the set of nodal services;
   performing the sub-steps of:
      suspending new operations with a dependency level equal to a highest number of dependency levels; and
      waiting for currently running operations with the highest dependency level to complete;
   repeating the performing step for a different phase of the migration of nodal services as long as there are unprocessed phases for the migration of nodal services.

2. The method as defined in claim 1, wherein the step of repeating the performing step further comprises the sub-steps of:
   decrementing a highest number N of dependency levels present in the migration of nodal services wherein N is from 0 to i levels where i is an initial highest number of dependency levels; and
   checking the highest number N of dependency levels to see if it has reached zero.

3. The method as defined in claim 2, wherein the sub-step of checking the highest number N of dependency levels further comprises the secondary sub-step of:
   wherein if the highest number N of dependency levels has not reached zero then repeating the performing step;
   wherein if the highest number N of dependency levels has reached zero then not repeating the performing step.

4. The method as defined in 1, further comprising the steps of:
   commencing transfer of service state from the first node to a second node;
   sending explicit state messages with state content from the first node to the second node; and
   redirecting all suspended and future first node operations to the second node.

5. The method as defined in 4, wherein the redirecting all suspended and future first node operations to the second node step further comprises the sub-step of:
   inserting one or more error codes in all first node suspended operations.

6. The method as defined in claim 5, wherein the sub-step of inserting one or more error codes in all first node suspended operations further comprises the one or more error codes indicating that all of the first node suspended operations were not able to complete on the first node and that any other nodes that previously requested the completion of any of the suspended operations must now transmit to the second node a request for completion of any of the suspended operations.

7. The method as defined in claim 1, wherein the network, plurality of nodes and operational services further comprises a IBM General Parallel File System for AIX, to allow migration of a file system manager from one node to another.

8. The method as defined in claim 1, further comprising the steps of:
   commencing transfer of service state from the first node to a second node;
   discarding any state content on the first node;
   invoking a failure recovery process for the first node; and
   redirecting all suspended and future first node operations to the second node.

9. The method as defined in claim 8, wherein the redirecting all suspended and future first node operations to the second node step further comprises the sub-step of:
   inserting one or more error codes in all first node suspended operations.

10. The method as defined in claim 9, wherein the sub-step of inserting one or more error codes in all first node suspended operations further comprises the one or more error codes indicating that all of the first node suspended operations were not able to complete on the first node and that any other nodes that previously requested the completion of any of the suspended operations must now transmit to the second node a request for completion of any of the suspended operations.

11. The method as defined in claim 10, wherein the network, plurality of nodes and operational services further comprises IBM General Parallel File System for AIX, to allow migration of a file system manager from one node to another.

12. A computer readable medium comprising programming instructions for nodal migration of nodal services associated with a network having a plurality of nodes connected thereto, the programming instruction for execution on a first node comprising:
   assigning a dependency level to each service of a set of nodal services; and
   determining a highest number of dependency levels present in the set of nodal services;
   performing the instructions of:

suspending new operations with a dependency level equal to a highest number of dependency levels; and waiting for currently running operations with the highest dependency level to complete;

repeating the performing step for a different phase of the migration of nodal services as long as there are unprocessed phases for the migration of nodal services.

13. The computer readable medium as defined in claim 12, wherein the programming instruction of repeating the performing instruction further comprises the instruction of:

decrementing a highest number N of dependency levels present in the migration of nodal services wherein N is from 0 to i levels where i is an initial highest number of dependency levels; and checking the highest number N of dependency levels to see if it has reached zero.

14. The computer readable medium as defined in claim 13, wherein the programming instruction of checking the highest number N of dependency levels further comprises the secondary instructions of:

wherein if the highest N of dependency levels has not reached zero then repeating the performing step;

wherein if the highest number N of dependency levels has reached zero then not repeating the performing step.

15. The computer readable medium as defined in claim 12, further comprising the programming instructions of:

commencing transfer of service state from the first node to the second node;

sending explicit state messages with state content from the first node to the second node; and redirecting all suspended and future first node operations to the second node.

16. The computer readable medium as defined in claim 15, wherein the programming instruction of redirecting all suspended and future first node operations to the second node instruction further comprises the instruction of:

inserting one or more error codes in all first node suspended operations.

17. The computer readable medium as defined in claim 16, wherein the programming instruction of inserting one or more error codes in all first node suspended operations further comprises the one or more error codes indicating that all of the first node suspended operations were not able to complete on the first node and that any other nodes that previously requested the completion of any of the suspended operations must now transmit to the second node a request for completion of any of the suspended operations.

18. The computer readable medium as defined in claim 12, wherein the network, plurality of nodes and operational services further comprises IBM General Parallel File System for AIX, to allow migration of a file system manager from one node to another.

19. A node in a system for nodal migration of services associated with a network having a plurality of nodes connected thereto, the node comprising:

an identification unit for assigning a dependency level to each service of a set of nodal services;

a determination unit for determining a highest number of dependency levels present in the set of nodal services;

a performance unit for controlling the sub-units of:
  a suspension unit for suspending new operations with a dependency level equal to a highest number of dependency levels;
  a hold unit for waiting for currently running operation to complete; and a repeating unit for indicating to the performing unit to repeat its functions for a different phase of the migration of nodal services as long as there are unprocessed phases for the migration of nodal services.

* * * * *

UNITED STATES PATENT AND TRADEMARK OFFICE
CERTIFICATE OF CORRECTION

PATENT NO. : 6,622,259 B1
DATED : September 16, 2003
INVENTOR(S) : Frank B. Schmuck

It is certified that error appears in the above-identified patent and that said Letters Patent is hereby corrected as shown below:

Column 5,
Line 1, from "because" to -- is because --

Column 7,
Line 2, from "in art" to -- in the art --

Signed and Sealed this

Second Day of December, 2003

JAMES E. ROGAN
*Director of the United States Patent and Trademark Office*